3,410,589
KNOTTER BILL HOOK
Edwin B. Nolt, New Holland, Pa., assignor to Sperry
 Rand Corporation, New Holland, Pa., a corporation
 of Delaware
Filed Apr. 25, 1967, Ser. No. 633,496
5 Claims. (Cl. 289—8)

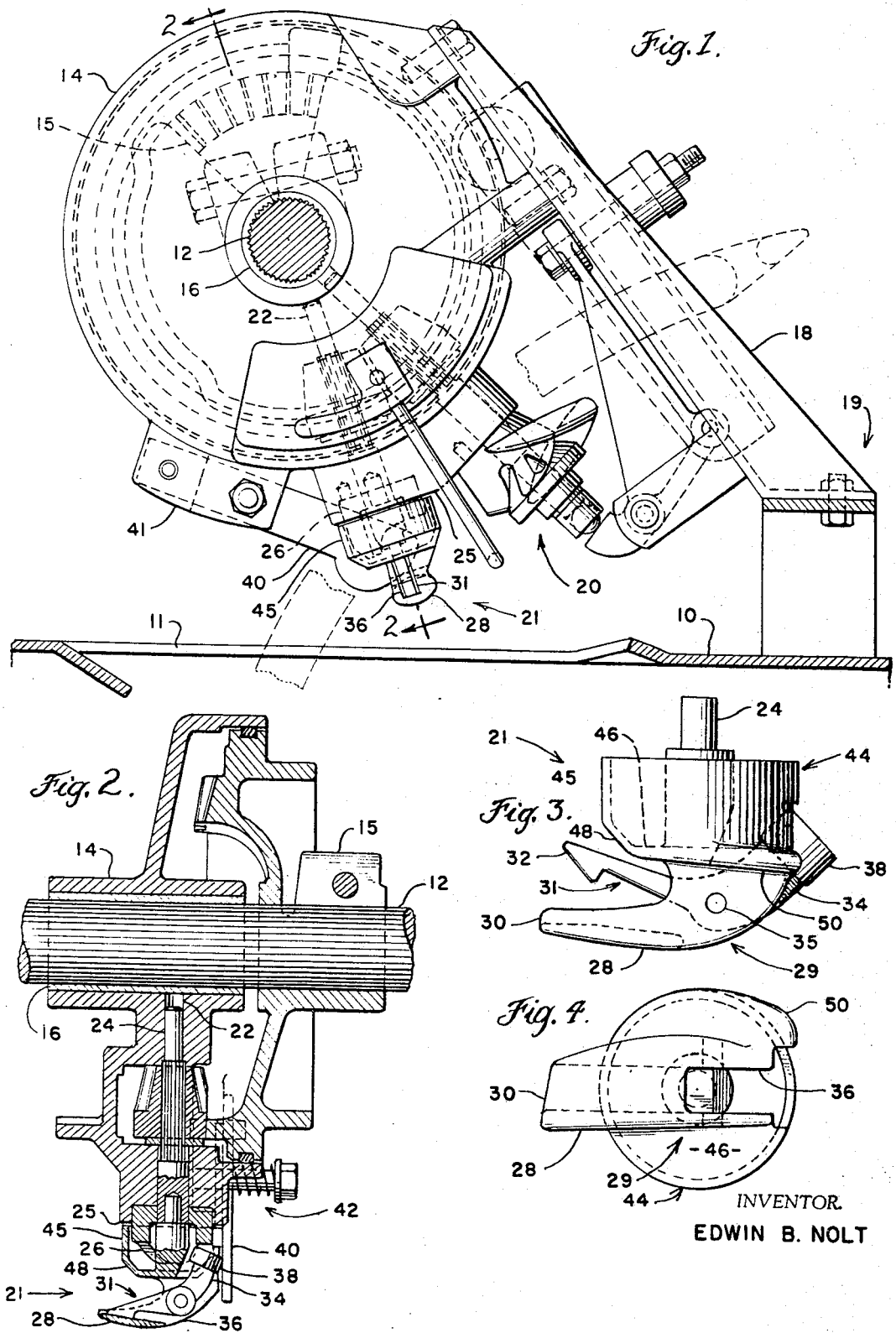

ABSTRACT OF THE DISCLOSURE

A knotter bill hook having a cup thereon surrounding the shank of the bill hook and enclosing the actuating end of the bill hook tongue and the tongue actuating cam to prevent the snagging of twine behind the actuating end of the tongue and to protect the tongue actuating cam.

Background of the invention

When the tying mechanism of a hay baler is triggered into action at the completion of a bale forming operation, less than one second elapses from the time a baler's needles leave "home" position, at the beginning of a tying cycle, until they again come to rest in the "home" position after the tie has been made. The actual knot tie is made in less than 1/25 of a second on a baler operating at conventional speed. Knotters for hay balers have been developed to a degree of operational dependability in excess of ninety-nine percent. To achieve this high degree of dependability of operation, the designers of knotters have obviously overcome the major and regularly occurring, or predictable, causes of misties. However, misties still occasionally occur. If one hundred percent dependability of operation is to be achieved, it is necessary for the knotter mechanism to cope with all causes of misties. Some of the causes of a knotter failing to complete a tie are related to variable and uncertain factors, such as variations in twine tension at different times and locations during a tying cycle, and the unpredictable way a slack loop of baler twine will kink because of the internal torsional stress created by its intertwined fibers.

Baler knotters must operate under widely varying adverse dust conditions. The buildup of dirt on moving parts is always an unpredictable source of concern in knotters. Recognizing the high degree of proficiency attained by present knotters, and that major redesign in an effort to achieve absolute perfection would involve obtaining solutions to a whole new set of problems, it is the object of the present invention to still further extend present knotter deesigns toward the ultimate goal of one hundred percent operational dependability by improving the design of a single knotter element to enable the knotter to better cope with some of the limited and not fully understood variable conditions that stand between present knotter designs and the ultimate goal of absolute operational dependability. The particular element with which the present invention is concerned is the knotter bill hook.

Summary of the invention

It has been discovered that there is a time, when the needle delivers the baler twine across the bill hook and into the twine clamp and then reverses its direction to return to "home" position, wherein there is a tendency for the knotter components to urge the twine to move up the shank of the bill hook. This time exists for only a fraction of a second following which the twine is urged downwardly on the bill hook shank again. The extent to which this occurs varies with the tension of the twine and possibly other unknown factors. With conventionally constructed bill hooks, it is possible, under the right conditions, for the twine to become snagged between the bill hook shank and the bill hook tongue actuating cam follower. When this occurs, a mistie results which could have been avoided had the twine been able to move back down along the bill hook shank without becoming snagged. The bill hook of the present invention incorporates onto the shank a shield, or cup, which positively prevents the twine from becoming snagged between the tongue cam follower and the shank. The present bill hook is designed to oppose the tendency of the twine to move upwardly on the shank in the first plate, and secondly to prevent the above mentioned snagging even though the twine should rise along the shank. Thirdly, the cup is designed to assist the twine in returning downwardly along the shank. The bill hook cup of the present invention fulfills the additional important function of completely enclosing the bill hook tongue actuating cam. This opposes the buildup of trouble-causing dirt on the cam as well as preventing interference with the bill hook operation by foreign matter which on previous bill hooks has sometimes lodged between the bill hook tongue cam follower and the tongue actuating cam.

Brief description of the drawings

FIG. 1 is a side elevational view of a knotter mounted atop the top wall of a hay baler bale case;

FIG. 2 is a sectional view taken on the line 2—2 of FIG. 1;

FIG. 3 is a side elevational detailed view, to an enlarged scale, of the bill hook of the present invention in the same angular orientation as it is shown in FIG. 2; and FIG. 4 is a bottom view of the bill hook shown in FIG. 3, with the bill hook tongue omitted.

Description of the preferred embodiment

In FIG. 1 of the drawings, the reference numeral 10 indicates the top wall of a hay baler bale case. Bale case wall 10 is provided with the usual slot 11 through which the hay baler's needles (indicated in phantom in FIG. 1) deliver a strand of twine upwardly through the bale case at the completion of a bale forming operation in order that the automatic tying mechanism may complete the banding of a bale. Overlying the needle slots 11 is the usual knotter shaft 12. The knotter shaft 12 supports the main knotter frame casting 14 and the combined cam and segment gear 15 (see FIG. 2).

As indicated in FIG. 2, the cam and segment gear 15 is fixedly splined on shaft 12 while the main knotter frame casting 14 is carried on shaft 12 by an internally splined bushing 16 which permits relative rotation between bushing 16 and main frame casting 14. Referring again to FIG. 1, a rigid arm 18 extends from the top of main knotter frame casting 14 downwardly and rearwardly along the bale case and is fixedly attached to bale case wall 10 as indicated at 19. The arm 18 prevents movement of the main knotter frame casting 14 relative to bale case wall 10. Thus, when the knotter shaft 12 is rotated through one revolution at the completion of a bale forming operation, the cam and segment gear 15 rotates along with shaft 12 while the main knotter frame 14 remains fixed relative to bale case wall 10. This relative rotation between cam and gear segment 15 and casting 14 effects the usual one revolution operation of a cone-type twine clamp 20 and a bill hook assembly 21 to tie together the two ends of a twine strand encircling the previously formed bale and to clamp one end of the twine strand that will encircle the next bale to be formed. Since the present invention is primarily concerned with the construction of the bill hook, it is not believed that a detailed explanation of the knot tying operation would add materially to an understanding of the invention. The elements described thus far, or their counterparts, will be readily identifiable and their operation understood by those skilled in the art upon reference to prior art patents such as U.S. Patent 615,815 to S. K. Dennis and 512,762 to B. F. Stewart.

So far as the bill hook structure is concerned, it may be well to note in FIG. 2 that the knotter main frame casting 14 is provided with a radial bore 22 in which the shank 24 of bill hook assembly 21 is journalled. The bore 22 opens through a planar exterior bottom surface 25 of the main frame casting 14. A circular cam member 26 is recessed into the surface 25 and projects outwardly therefrom as may be seen in FIG. 2. Cam member 26 encircles the bill hook shank 24 and the bore 22 in which the bill hook shank is journalled.

Referring now primarily to FIGS. 3 and 4, the bill hook 21 has a fixed jaw 28 integrally formed on the bottom end of bill hook shank 24. The fixed jaw 28 has a heel portion 29 at the base of shank 24 and an outer terminal end portion 30 which is disposed laterally outwardly from the axis of the bill hook shank 24. The usual bell crank-shaped bill hook tongue 31 is disposed in the usual manner to coact with fixed jaw 28. The tongue 31 has a first end 32 disposed adjacent the outer terminal end 30 of fixed jaw 28. The second end 34 of the bill hook tongue 31 extends generally upwardly relative to the shank and is disposed adjacent the lower end of bill hook shank 24. An intermediate portion of tongue 31 is journalled on the heel of fixed jaw 28 by the usual pivot pin 35 whereby movement of the end 34 of tongue 31 toward shank 24 from the position shown in FIG. 3, is accompanied by movement of the first end 32 of bill hook tongue 31 downwardly toward the outer terminal end 30 of fixed jaw 28. As may be seen in FIGS. 1, 2, and 4, the fixed jaw 28 is appropriately slotted, as indicated at 36, to internally receive the tongue 31.

The usual cam follower roller 38 is journalled on the end 34 of tongue 31 for rotation relative thereto about an axis extending generally perpendicular to the axis of pivot pin 35.

Referring now to FIGS. 1 and 2, wherein the knotter elements are shown in their "rest" position, ready for a tying operation, it may be seen that a flat pressure plate 40 is cantilever mounted on a detent 41 depending from main knotter casting 14. The pressure plate 40 extends from detent 41 rearwardly to a position alongside bill hook assembly 21. The plate 40 is spring loaded laterally toward the bill hook assembly by a coil spring and bolt which are collectively indicated by the reference numeral 42 in FIG. 2. In FIG. 2, it may be seen that pressure plate 40 bears against cam follower roller 38 on the bill hook tongue to hold the tongue, or movable jaw, of the bill hook closed when the knotter is in the "rest" position.

It will be apparent from FIG. 2, that as the bill hook shank 24 rotates, the roller 38 will move out from behind pressure plate 40. Rotation of the bill hook relative to fixed cam 26 will cause roller 38 to travel along the surface of cam 26 to effect opening of the bill hook tongue 31 at the appropriate time by forcing the cam follower roller 38 and the second end 34 of the bill hook tongue radially outwardly from the shank 24 of the bill hook. The various movable elements of the knotter are timed so that rotation of the bill hook tongue begins after the baler needle has delivered the second strand of twine on top of bill hook tongue 31. This timing will be apparent from the previously mentioned Dennis Patent 615,815. The bill hook 21, as viewed from the bottom in FIG. 1, rotates in the counterclockwise direction. The main knotter shaft 12 and gear segment 15 rotate in the counterclockwise direction about the axis of shaft 12 to effect this bill hook rotation in the usual manner.

When the bill hook cam follower roller 38 moves from behind pressure plate 40, it is still forced radially inwardly against cam surface 26 because of the pressure of the twine strands which are disposed on top of the first end portion 32 of tongue 31. Cam 26 forces the roller outwardly.

As previously stated, the actual tying operation occurs in less than ⅟₂₅ of a second. During this time interval, the baler needles are travelling upwardly and back, the twine clamping assembly 20 is rotating, and the bill hook 21 is rotating. Each of these elements are moving the twine strands in various directions.

Referring again to FIGS. 3 and 4 of the drawings, the present bill hook has integrally formed about the base of shank 24 a cup generally indicated by the reference numeral 44. Cup 44 comprises a first cylindrical wall 45 encircling the base end of the bill hook shank 24 and spaced outwardly therefrom. The upper end of the cup is open while the bottom end of the cup is closed by an end wall 46 which interconnects the first wall and the bill hook shank adjacent the heel portion of fixed bill hook jaw 28. The aforementioned aperture 36 provided in the fixed jaw 28 and shank 24 to accommodate bill hook tongue 41, also extends through walls 45 and 46 of cup 44 as may be seen in FIG. 4, to accommodate the in and out movement of the second end 34 of the bill hook tongue and its cam follower roller 38. In FIG. 3 it may be seen that a bevel outer wall portion 48 is provided at the jointure of cup walls 45 and 46. The bevel wall portion 48 converges downwardly toward the fixed jaw of the bill hook. This is to facilitate the downward movement of twine along the outer surface of cup wall 45 toward the bill hook jaw.

In FIG. 3, the bill hook tongue 31 is shown in its maximum open position, or in other words, the cam follower roller 38 is shown the maximum lateral distance outwardly from shank 24 to which cam surface 26 moves it. Note that the inner portion of cam follower roller 38 remains inside cup 44 in this maximum outward position. Thus, if the twine moves upwardly along the heel 29 of jaw 28 and over the top of cam follower roller 38, the cup 44 prevents the twine from moving downwardly between the shank and the inboard side of the second end 34 of the tongue. When the twine is again urged downwardly along the shank, it is free to return along the same path that it followed in rising up the shank. The ledge 50 seen in FIGS. 3 and 4 is formed on the outer surface of walls 45 and 46 to oppose the tendency of the twine to move up the shank in the first place; however, due to the presence of cup 44 a tie will not be missed even if the twine does work up the shank over the ledge 50. Note, also that in the tongue closed position of FIG. 2, the outer side of roller 38 remains projected outside of cup 44.

It may also be noted in FIGS. 1 and 2 that cup 44 extends upwardly along the shank of the bill hook to the bottom surface 25 of the main knotter base frame casting 14. Thus, cup 44 completely encloses and shields the circular cam 26 which operates the bill hook tongue. This prevents interference with the bill hook tongue operation by foreign matter which on conventional knotters sometimes becomes lodged between the tongue cam follower roller and the tongue operating cam.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as falls within the scope of the invention or the limits of the appended claims.

Having thus described my invention, what I claim is:

1. A bill hook for tying a knot in a pair of twine ends comprising: a shank, a fixed jaw on said shank and having a heel portion at one end of the shank, said jaw projecting laterally outwardly from said shank and having an outer terminal end portion, a tongue having a first end disposed adjacent said outer terminal end portion of said jaw, said tongue having a second end adjacent said one end of said shank, said tongue having an intermediate portion disposed at said heel portion of said jaw, pivot means journalling said intermediate portion of said tongue on said heel portion of said jaw whereby movement of said second end of said tongue about said pivot means toward and away from said shank effects movement of said first end of said tongue about said pivot means relative to said outer terminal end portion of said fixed jaw, cam follower means on said second end of said tongue, said bill hook further comprising a cup having a first wall encircling said shank at said one end thereof and spaced outwardly from the shank, said cup having an end wall interconnecting said first wall and said shank adjacent said heel portion of said fixed jaw, and said cup walls having an aperture therein through which said second end of said tongue is movable toward and away from said shank, and a portion of said cam follower means projecting inside said first wall of said cup when said second end of said tongue is moved its maximum operative distance laterally away from said shank.

2. A bill hook as recited in claim 1 wherein said cam follower means comprises a roller journalled on said second end of said tongue for rotation relative to said tongue about an axis generally perpendicular to the pivot axis of said pivot means, said roller having one part of its outer periphery remaining outside said cup and a diametrically opposing part of its outer periphery remaining inside said cup throughout the operative range of pivotal movement of said second end of said tongue toward and away from said shank about said pivot means.

3. A bill hook as recited in claim 1 wherein said shank has a central longitudinal axis, said first wall of said cup being a cylindrical wall concentric with said axis of said shank, said end wall being disposed in a plane perpendicular to said axis, and said cylindrical wall and said end wall joining each other in a bevel outer wall portion converging toward said fixed jaw.

4. In combination with a knotter frame having a bill hook shank receiving bore therein opening exteriorly of the frame through a predetermined exterior surface, and fixed cam means on said exterior surface concentric with said bore, an improved bill hook comprising a shank journalled in said bore and having one end projecting from said frame beyond said cam means, a fixed jaw on said one end of said shank and projecting laterally from the shank, a tongue having a mid-portion pivotally mounted on said fixed jaw, one end of said tongue being disposed along said fixed jaw to pivotally open and close relative to said jaw, said tongue having a second end engageable with said cam means whereby said cam means effects opening and closing of said tongue relative to said jaw in response to rotation of said shank relative to said fixed cam means, and a cup formed integrally with said shank and coacting with said exterior surface of said frame to enclose said cam means, said cup having a lateral opening therein, and said second end of said tongue extending into said cup through said lateral opening to engage said enclosed cam means.

5. A knotter bill hook having a shank, a laterally extending fixed jaw on said shank, a tongue having a first portion overlying said fixed jaw and a second portion extending along said shank, said second portion of said tongue being movable laterally relative to said shank toward and away from the shank, a cup encircling said shank adjacent said fixed jaw and having a wall spaced outwardly from said shank, and said wall defining therein an aperture through which said second portion of said tongue passes in moving laterally toward and away from said shank.

References Cited
UNITED STATES PATENTS

| | | | |
|---|---|---|---|
| 592,514 | 10/1897 | Sheets | 289—11 |
| 796,926 | 8/1905 | McElroy | 289—11 |
| 2,670,230 | 2/1954 | Goodhue et al. | 289—8 |
| 3,101,963 | 8/1963 | Sullivan et al. | 289—11 |

LOUIS K. RIMRODT, *Primary Examiner.*